(12) United States Patent
Suzuki et al.

(10) Patent No.: US 9,390,851 B2
(45) Date of Patent: Jul. 12, 2016

(54) COIL

(71) Applicant: TDK CORPORATION, Tokyo (JP)

(72) Inventors: Mitsunari Suzuki, Tokyo (JP); Takeshi Kamono, Tokyo (JP); Yasuhiro Terasaki, Tokyo (JP); Noritaka Chiyo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/554,702

(22) Filed: Nov. 26, 2014

(65) Prior Publication Data

US 2015/0145630 A1    May 28, 2015

(30) Foreign Application Priority Data

Nov. 28, 2013  (JP) ................. 2013-246455
Oct. 17, 2014  (JP) ................. 2014-212678

(51) Int. Cl.
*H01F 27/28*  (2006.01)
*H01F 21/02*  (2006.01)
*H01F 27/30*  (2006.01)
*H01F 38/14*  (2006.01)
(Continued)

(52) U.S. Cl.
CPC .............. *H01F 38/14* (2013.01); *B60L 11/182* (2013.01); *H01F 27/2871* (2013.01); *H01F 27/325* (2013.01); *H01F 41/071* (2016.01); *H01F 27/2823* (2013.01); *H01F 27/306* (2013.01);
(Continued)

(58) Field of Classification Search
CPC . H01F 38/14; H01F 27/2804; H01F 27/2871; H01F 27/325; H01F 27/306; H01F 27/362; H01F 27/365; H01F 2027/2809; H01F 41/071; B60L 11/182; Y02T 90/122; Y02T 90/14; Y02T 10/7005; Y02T 10/7072; H02J 7/025
USPC .......... 336/200, 198, 208, 192, 147, 222, 185
See application file for complete search history.

(56) References Cited

U.S. PATENT DOCUMENTS 8,143,986 B2 *  3/2012  Tanabe ................ H01L 23/5227
                                                336/200
8,207,807 B2 *  6/2012  Kikuchi ............... H01F 27/2871
                                                336/188
(Continued)

FOREIGN PATENT DOCUMENTS

JP    A-2011-86890       4/2011
WO    2013/091683 A1     6/2013

OTHER PUBLICATIONS

Nov. 20, 2015 Extended Search Report issued in European Patent Application No. 14195247.3.

*Primary Examiner* — Mangtin Lian
(74) *Attorney, Agent, or Firm* — Oliff PLC

(57) ABSTRACT

A coil which maintains a balance of a parasitic capacitance and has a structure that can be multilayered. The coil is stacked with a structure which includes winding wire portions formed of a wire wound for several turns in a plane in each layer, wherein winding wire portions in each layer include a first winding portion formed by performing a single turn of winding in each layer in a same winding direction from a bottom layer to an uppermost layer, and a second winding portion formed by performing a single turn of winding in each layer in a same winding direction from the uppermost layer to the bottom layer, and the winding directions of the first and second winding portions are identical to each other and the first winding portion and the second winding portion are joined in the uppermost layer or the bottom layer.

3 Claims, 4 Drawing Sheets

(51) Int. Cl.
*B60L 11/18* (2006.01)
*H01F 27/32* (2006.01)
*H01F 27/36* (2006.01)
*H02J 7/02* (2016.01)

(52) U.S. Cl.
CPC ............ *H01F 27/362* (2013.01); *H01F 27/365* (2013.01); *H02J 7/025* (2013.01); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 2002/0140538 A1 | 10/2002 | Yer et al. |
| 2008/0252409 A1* | 10/2008 | Kojima ............... H01F 38/14 336/185 |
| 2011/0198940 A1 | 8/2011 | Urano |
| 2013/0002390 A1 | 1/2013 | Nam et al. |

* cited by examiner

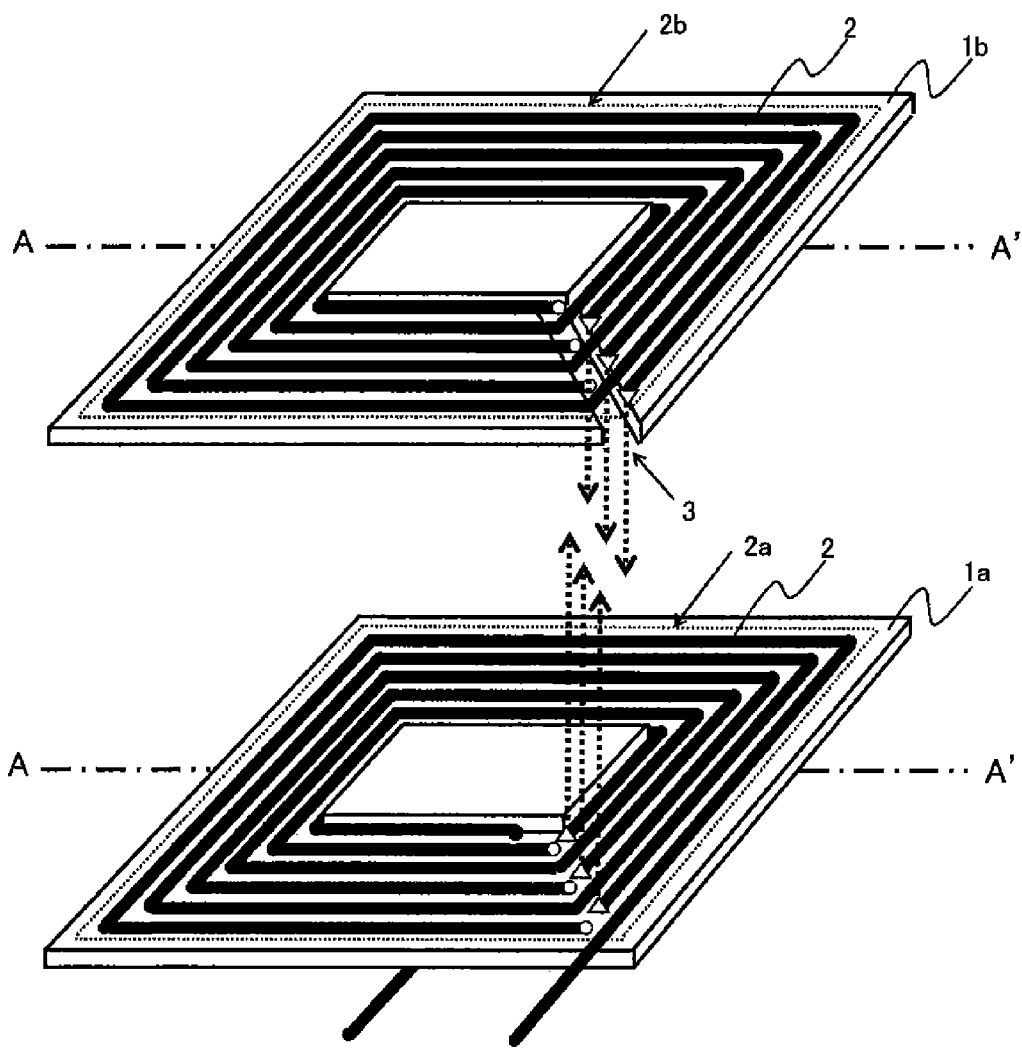
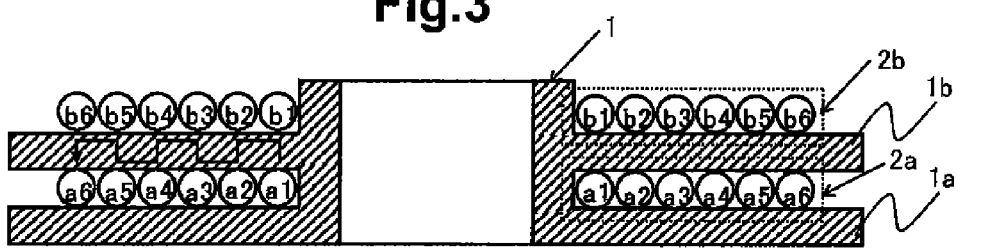
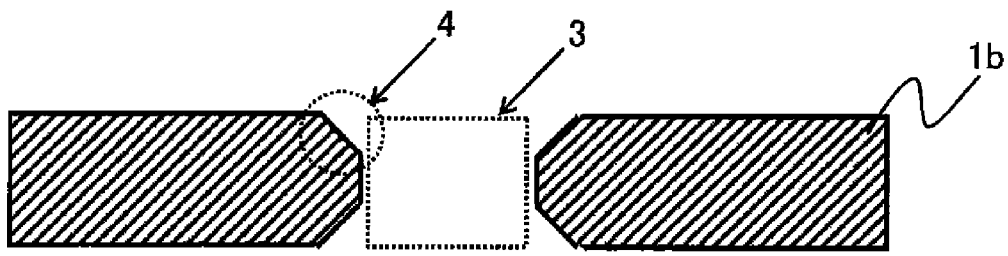
Fig.3
Fig.4
Fig.5

COIL

The present invention relates to a coil for transmitting power or receiving power which is used in a contactless power supply apparatus for supplying power in a contactless manner.

BACKGROUND

In recent years, the contactless power transmission is attracting attentions with which the power is transmitted in a contactless manner from the power transmitting side to the power receiving side. For example, the contactless charging device is increasingly developed which uses the technique of contactlessly transmitting power in order to charge the battery mounted in an electric vehicle. In such a contactless charging device, a spiral coil formed in a plane is mostly used as the coil for transmitting power or receiving power. However, as the coil for transmitting power or receiving power, in order to obtain sufficient properties, there is a problem that the size of coil becomes large.

As a means to solve such a problem, Patent Document 1 has disclosed a coil with a double layered structure which is obtained by connecting a spiral coil formed in the first layer and a spiral coil formed in the second layer in series. The spiral coil is usually used by disposing a magnetic plate made from a magnetic material and a metallic plate (such as an aluminum plate and a copper plate) made from a nonmagnetic metallic material on the back side of the coil, and thus a parasitic capacitance is generated between the conductor of the coil and the metallic plate. In addition, in the coil with a double layered structure, the distance between the conductor of the spiral coil formed in the first layer and the metallic plate is different from that between the conductor of the spiral coil formed in the second layer and the metallic plate, and thus the parasitic capacitance generated between the conductor of the spiral coil formed in the first layer and the metallic plate will differ from that generated between the conductor of the spiral coil formed in the second layer and the metallic plate.

Patent Document

Patent Document 1: JP-A-2011-86890

SUMMARY

Therefore, when the coil with a double layered structure which has been disclosed in Patent Document 1 is used in the power transmission, the voltage to ground of the metallic plate sometimes is increased under the influence of the imbalance of the parasitic capacitance.

In this respect, the present invention aims to provide a coil which is capable of maintaining the balance with the parasitic capacitance of the metallic plate and has a structure that can be configured multilayered. Further, the present invention also aims to provide a coil with a multilayered structure having good productivity.

In order to solve the problems mentioned above, the coil according to the present invention is a coil with a stacked structure which is provided in each layer with a winding wire portion formed of a wire wound for several times in a plane, wherein the winding wire portion in each layer includes a first winding portion formed by for performing a single turn of winding in each layer in a same winding direction from a bottom layer to an uppermost layer and a second winding portion formed by performing a single time of winding in each layer in a same winding direction from the uppermost layer to the bottom layer, and the winding directions of the first winding portion and the second winding portion are identical to each other and the first winding portion and the second winding portion are joined in the uppermost layer or the bottom layer.

In this structure, each part of the wire can be dispersedly disposed in the winding wire portion in each layer. That is, the parts forming the winding wire portion of each layer from the bottom layer to the uppermost layer can be dispersed between one end portion and the other end portion of the wire, and a bias that the winding wire portion in the bottom layer is disposed at a side close to one end portion of the wire and the winding wire portion in the uppermost layer is disposed at a side close to the other end portion of the wire will not occur. Thus, an imbalance of a parasitic capacitance with a metallic plate due to a structure of the coil is also inhibited. Further, as the winding process in each layer can be performed in parallel, the coil with a multilayered structure can be effectively produced.

Preferably, the winding wire portions in the adjacent upper and lower layers face to each other through an insulating member. According to this structure, the winding wire portions in the adjacent upper and lower layers are separated, and thus a loss due to the closing effect among these winding wire portions can be eliminated.

Preferably, the insulating member may be a planar member provided with a slit, and the wires of the winding wire portions in the adjacent upper and lower layers are joined via this slit.

The winding wire portion can be effectively formed in each layer by disposing a slit on the planar member. In addition, the wires are joined via the slit between the winding wire portions in the adjacent upper and lower layers, and thus the wire will not be provided with an excess pressure.

In addition, the coil of the present invention is a coil with a stacked structure and includes a bobbin which includes a plate portion for separating a wire-accommodating portion in each layer, and a winding wire portion which is formed of a wire wound several times in a plane and is accommodated in the wire-accommodating portion in each layer, wherein the winding wire portion includes a first winding portion formed by performing a single turn of winding in each layer in a same winding direction from a bottom layer to an uppermost layer of the wire-accommodating portion, and a second winding portion formed by performing a single turn of winding in each layer in a same winding direction from the uppermost layer to the bottom layer of the wire-accommodating portion with a single turn for each layer, and the winding directions of the first winding portion and the second winding portion are identical to each other and the first winding portion and the second winding portion are joined in the uppermost layer or the bottom layer of the wire-accommodating portion.

In this structure, each parts of the wire can be dispersedly disposed in the winding wire portion of each layer which is accommodated in the wire-accommodating portion. Thus, an imbalance of a parasitic capacitance due to a structure of the coil is inhibited. Further, since the wire-accommodating portion in each layer is separated by the plate portion, a loss due to a closing effect between the winding wire portions in the adjacent upper and lower layers can be eliminated.

In addition, since the winding process of the wire-accommodating portion in each layer can be performed in parallel, the coil with a multilayered structure can be effectively produced.

Preferably, the plate portion may include a slit, and the wires of the winding wire portions which are accommodated in the wire-accommodating portions in the adjacent upper and lower layers are joined via this slit.

The winding wire portion accommodated in the wire-accommodating portion of each layer can be effectively formed by disposing such a slit. In addition, the wires are joined via the slit between the winding wire portions accommodated in the wire-accommodating portions in the adjacent upper and lower layers, and thus the wire will not be provided with an excess pressure.

According to the coil with a multilayered structure according to the present invention, a coil with a multilayered structure can be effectively prepared in which a distribution of a parasitic capacitance with a metallic plate is more uniform.

BRIEF DESCRIPTION OF THE DRAWINGS

FIG. 3 is a schematic exploded view showing the structure of the coil with double layers according to the second embodiment.

FIG. 4 is a sectional view showing the section of the coil with a double layered structure according to the second embodiment.

FIG. 5 is a sectional view showing the section of the slit.

Figure 1:
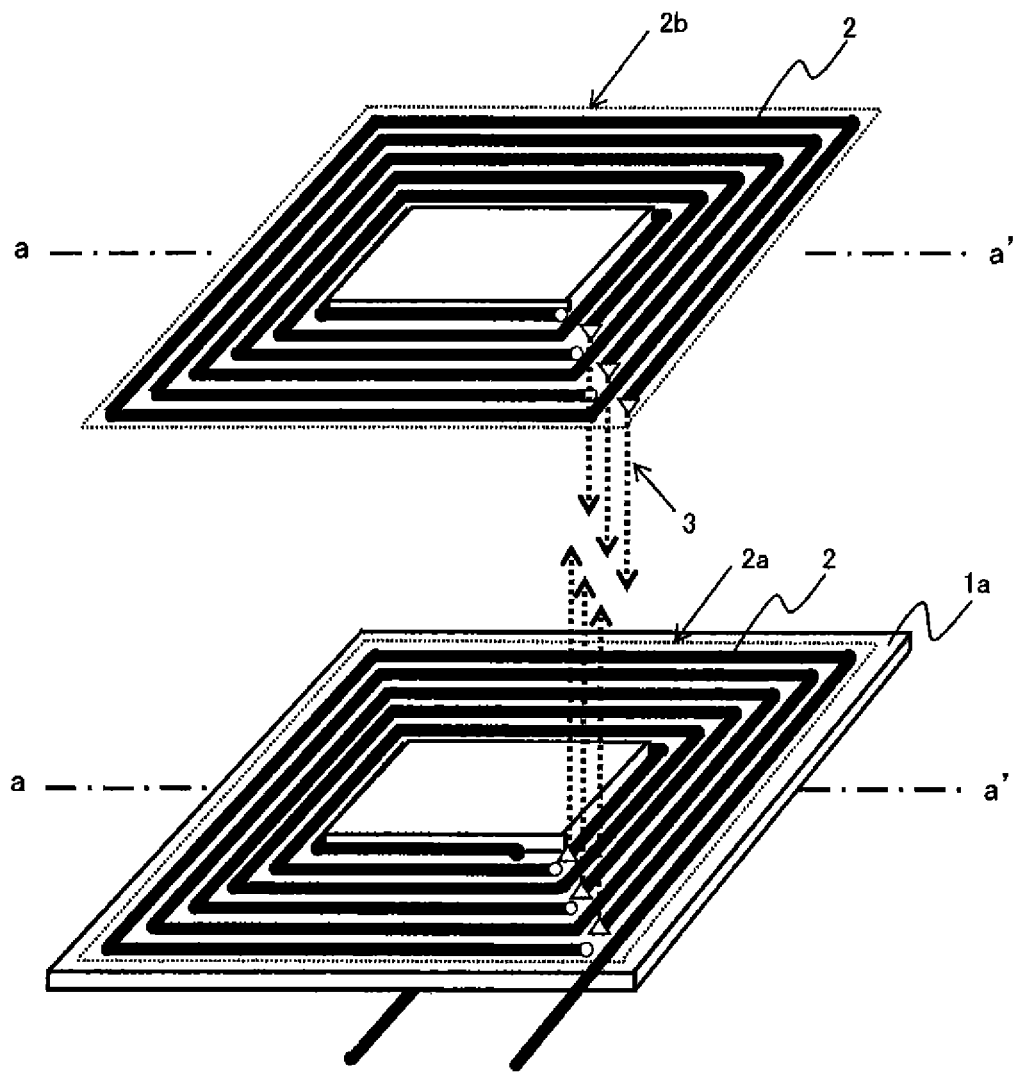
FIG. 1 is a schematic exploded view showing the structure of the coil with double layers according to the first embodiment.

DESCRIPTION OF REFERENCE NUMERALS 1. the bobbin
1a, 2b, 1c. the plate portion
2. the wire
2a, 2b, 2c. the winding wire portion
3. the slit
4. the chamfer portion
10, 30. the power transmitting coil
11, 21, 31a, 31b, 41a, 41b. coil
12, 22, 32, 42. the magnetic member
13, 23, 33, 43. the metallic plate
20, 40. the power receiving coil

DETAILED DESCRIPTION OF EMBODIMENTS

The embodiments for carrying out the present invention will be explained in detail with reference to the accompanying drawings. Further, the present invention is not limited to these embodiments to be described below. In addition, the same reference numeral refers to the same element or an element having the same function, and repeated descriptions will be omitted in the following description.

Figure 2:
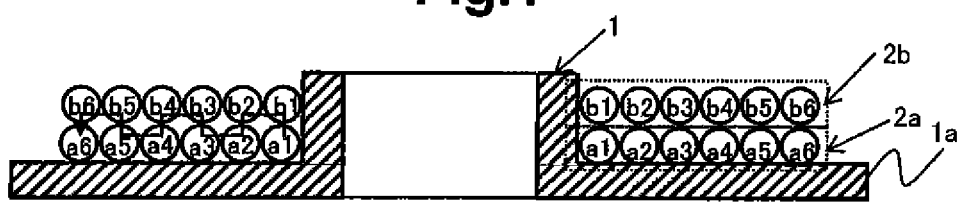
FIG. 2 is a sectional view showing the section of the coil with a double layered structure according to the first embodiment.

FIG. 1 is a schematic exploded view showing the coil with a double layered structure according to the first embodiment with each layer being separated from each other, and FIG. 2 is a sectional view showing the section of the coil along the line a-a'. The coil with a double layered structure includes a winding wire portion 2a of the first layer (the bottom layer) and a winding wire portion 2b of the second layer (the uppermost layer) both of which are formed by winding a wire 2. The bobbin 1 of the coil has a wire-accommodating portion of the first layer (the bottom layer) and a wire-accommodating portion of the second layer (the uppermost layer) on the plate portion 1a on the side of the upper surface. In addition, the winding wire portion 2a of the first layer (the bottom layer) is accommodated in the wire-accommodating portion of the first layer (the bottom layer), and the winding wire portion 2b of the second layer (the uppermost layer) is accommodated in the wire-accommodating portion of the second layer (the uppermost layer). Herein, the wire-accommodating portion refers to a space to accommodate the winding wire of each layer. That is, in the present embodiment, two wire-accommodating portions are provided, one of which the winding wire portion 2a of the first layer is accommodated and the other of which the winding wire portion 2b of the second layer is accommodated.

In the coil with a double layered structure, the winding wire in the innermost periphery of the winding wire portion 2a of the first layer (the bottom layer) and the winding wire in the innermost periphery of the winding wire portion 2b of the second layer (the first circle of the winding wire) (the uppermost layer) are joined (directly connected), and the second circle of winding wire from the innermost periphery of the winding wire portion 2a (the second circle of the winding wire) and the second circle of winding wire from the innermost periphery of the winding wire portion 2b (the second circle of the winding wire) are joined (directly connected). Similarly below, the winding wires with the same winding number are joined (directly connected) to each other. In addition, the first circle of winding wire and the second circle of winding wire are joined in the second layer (the uppermost layer), and the second circle of winding wire and the third circle of winding wire are joined in the first layer (the bottom layer). Similarly below, the winding wire of each winding number is joined to the winding wire of the next winding number in the first layer (the bottom layer) or the second layer (the uppermost layer).

That is, in the coil according to the present invention having a structure of n layers (n represents an integer that is equal to or larger than 2), the winding wires of circle No. j (j refers to an integer that is equal to or larger than 1) in each layer are joined between the adjacent layers, and the winding wire of circle No. j and the winding wire of circle No. (j+1) are joined in the first layer (the bottom layer) or layer No. n (the uppermost layer). Further, all the wires forming the winding wire portion in each layer are wound in the same winding direction. Thus, a magnetic field will be generated that is substantially the same as that generated when n layers of spiral coils are stacked.

Next, the winding process for forming the winding wire portion 2a of the first layer (the bottom layer) and the winding wire portion 2b of the second layer (the uppermost layer) will be explained. The winding process may be started by winding either one of the winding wire portion 29 of the first layer (the bottom layer) and the winding wire portion 2b of the second layer (the uppermost layer), but in the following explanation, the winding process is started by winding the winding wire 2a of the first layer (the bottom layer). Further, in the following winding process, all the winding processes are performed in the same direction.

First of all, the winding process from the first circle of the winding wire portion 2a of the first layer (the bottom layer) to the first circle of the winding wire portion 2b of the second layer (the uppermost layer) will be explained. In this process, the winding process for forming the first circle of winding wire a1 in the winding wire portion 2a of the first layer (the bottom layer) is performed at first, and then the winding process for forming the first circle of winding wire b1 in the winding wire portion 2b of the second layer (the uppermost layer) is performed. As such, a single turn of winding is performed from the bottom layer to the uppermost layer in sequence, and thereby a circle of winding wire is formed in the winding wire portion of each layer. Hereinafter, this process is referred to as the first winding process, and the part formed in the first winding process becomes the first winding portion in which a single turn of winding is performed for each layer in the same winding direction from the bottom layer to the uppermost layer.

Next, the winding process from the second circle of the winding we portion 2b of the second layer (the uppermost layer) to the second circle of the winding wire portion 2a of the first layer (the bottom layer) will be explained. In this process, the winding process for forming the second circle of winding wire b2 in the winding wire portion 2b of the second layer (the uppermost layer) is performed at first, and then the winding process for forming the second circle of winding wire a2 in the winding wire portion 2a of the first layer (the bottom layer) is performed. As such, a single turn of winding is performed from the uppermost layer to the bottom layer in sequence, and thereby a circle of winding wire is formed in the winding wire portion of each layer. Hereinafter, this process is referred to as the second winding process, and the part formed in the second winding process becomes the second winding portion in which a single turn of winding is performed for each layer in the same winding direction from the uppermost layer to the bottom layer.

In this way, the first circle of winding wire a1 in the winding wire portion 2a of the first layer (the bottom layer) and the first circle of winding wire b1 in the winding wire portion 2b of the second layer (the uppermost layer) are formed by performing the first winding process, and then the second winding process is performed, and thereby the second circle of winding wire b2 in the winding wire portion 2b of the second layer (the uppermost layer) and the second circle of winding wire a2 in the winding wire portion 2a of the first layer (the bottom layer) are formed. Similarly below, the first winding process and the second winding process are repeated alternatively so that the third to sixth circle of winding wires a3 to a6 in the winding wire portion 2a of the first layer (the bottom layer) and the third to sixth circle of winding wires b3 to b6 in the winding wire portion 2b of the second layer (the uppermost layer) are formed. The thus formed winding wire portion 2a of the first layer (the bottom layer) and the winding wire portion 2b of the second layer (the uppermost layer) become winding wire portions that are wound 6 circles in a plane. The planar winding wire portion 2a faces the winding wire portion 2b in a direction from the bottom layer to the uppermost layer. That is, when viewed from a direction from the bottom layer to the uppermost layer, the winding wire portion 2a and the winding wire portion 2b are formed so as to overlap each other with winding wires of the same winding number.

As described above, the coil with a double layered structure shown in FIG. 1 and FIG. 2 according to the first embodiment is formed by performing the first winding process and the second winding process each for three times. In other words, the first circle of winding wire a1 in the winding wire portion 2a of the first layer (the bottom layer) and the first circle of winding wire b1 in the winding wire portion 2b of the second layer (the uppermost layer) are formed by performing the first winding process for the first time, and then the second circle of winding wire b2 in the winding wire portion 2b of the second layer (the uppermost layer) and the second circle of winding wire a2 in the winding wire portion 2a of the first layer (the bottom layer) are formed by performing the second winding process for the first time. Then, the third circle of winding wire a3 in the winding wire portion 2a of the first layer (the bottom layer) and the third circle of winding wire b3 in the winding wire portion 2b of the second layer (the uppermost layer) are formed by performing the first winding process for the second time, and then the fourth circle of winding wire b4 in the winding wire portion 2b of the second layer (the uppermost layer) and the fourth circle of winding wire a4 in the winding wire portion 2a of the first layer (the bottom layer) are formed by performing the second winding process for the second time. Next, the fifth circle of winding wire a5 in the winding wire portion 2a of the first layer (the bottom layer) and the fifth circle of winding wire b5 in the winding wire portion 2b of the second layer (the uppermost layer) are formed by performing the first winding process for the third time, and then the sixth circle of winding wire b6 in the winding wire portion 2b of the second layer (the uppermost layer) and the sixth circle of winding wire a6 in the winding wire portion 2a of the first layer (the bottom layer) are formed by performing the second winding process for the third time.

The winding wire portions 2a and 2b can also be wound in any one of shapes such as a circle, an oval, a substantial quadrangle or the like. In addition, a wire obtained by covering the Litz wire with an insulating tube may also be used as the wire 2.

FIG. 3 is a schematic exploded view showing the coil with a double layered structure according to the second embodiment with each layer being separated from each other, and FIG. 4 is a sectional view showing the section of the coil along the line A-A'. The coil with a double layered structure includes a winding wire portion 2a of the first layer (the bottom layer) and a winding wire portion 2b of the second layer (the uppermost layer), both of which are formed by winding a wire 2. In addition, a bobbin 1 of the coil has a wire-accommodating portion of the first layer (the bottom layer) on a plate portion 1b on the side of the bottom surface (between the plate portion 1a and the plate portion 1b) and a wire-accommodating portion of the second layer (the uppermost layer) on the plate portion 1b on the side of the upper surface. That is, besides the difference about plate portion 1a, the bobbin 1 in the coil with a double layered structure according to the second embodiment further differs from that of the first embodiment in that a plate portion 1b is provided. Further, the winding wire portion 2a of the first layer (the bottom layer) is accommodated in the wire-accommodating portion of the first layer (the bottom layer) and the winding wire portion 2b of the second layer (the uppermost layer) is accommodated in the wire-accommodating portion of the second layer (the uppermost layer).

In the coil with a double-layered structure, the winding wire in the innermost periphery of the winding wire portion 2a of the first layer (the bottom layer) and winding wire in the innermost periphery of the winding wire portion 2b of the second layer (the uppermost layer) (the first circle of the winding wire) are joined (directly connected), and the second winding wire from the innermost periphery of the winding wire portion 2a (the second circle of the winding wire) and the second winding wire from the innermost periphery of the winding wire portion 2b (the second circle of the winding wire) are joined (directly connected). Similarly below, the winding wires with the same winding number are joined (directly connected) to each other. In addition, the first circle of the winding wire and the second circle of the winding wire are joined in the second layer (the uppermost layer), and the second circle of the winding wire and the third circle of the winding wire are joined in the first layer (the bottom layer). Similarly below, the winding wire of each winding number in the first layer (the bottom layer) or the second layer (the uppermost layer) is joined to the winding wire of the next winding number.

That is, in the coil according to the present invention having a structure of n layers (n represents an integer that is equal to or larger than 2), the winding wires of circle No. j (j refers to an integer that is equal to or larger than 1) in each layer are joined between the adjacent layers, and the winding wire of circle No. j and the winding wire of circle No. (j+1) are joined in the first layer (the bottom layer) or layer No. n (the uppermost layer). Further, all the wires forming the winding wire portion in each layer are wound in the same winding direction. Thus, a magnetic field will be generated that is substantially the same as that generated when n layers of spiral coils are stacked.

Next, the winding process for forming the winding wire portion $2a$ of the first layer (the bottom layer) and the winding wire portion $2b$ of the second layer (the uppermost layer) will be explained. The winding process may be started by winding either one of the winding wire portion $2a$ of the first layer (the bottom layer) and the winding wire portion $2b$ of the second layer (the uppermost layer), but in the following explanation, the winding process is started by winding the winding wire $2a$ of the first layer (the bottom layer). Further, in the following winding process, all the winding processes are performed in the same direction.

First of all, the winding process from the first circle of the winding wire portion $2a$ of the first layer (the bottom layer) to the first circle of the winding wire portion $2b$ of the second layer (the uppermost layer) will be explained. In this process, the winding process for forming the first circle of winding wire a1 in the winding wire portion $2a$ of the first layer (the bottom layer) is performed at first and then the winding process for forming the first circle of winding wire b1 in the winding wire portion $2b$ of the second layer (the uppermost layer) is performed. As such, a single turn of winding is performed from the bottom layer to the uppermost layer in sequence, and thereby a circle of winding wire is formed in the winding wire portion of each layer. Hereinafter, this process is referred to as the first winding process, and the part formed in the first winding process becomes the first winding portion in which a single turn of winding is performed for each layer in the same winding direction from the bottom layer to the uppermost layer. Further, when the wire 2 is moved from the first circle in the winding wire portion $2a$ of the first layer (the bottom layer) to the first circle in the winding wire portion $2b$ of the second layer (the uppermost layer), it passes through a slit 3 provided in the plate portion $1b$ and enters into the wire-accommodating portion of the second layer (the uppermost layer) from the wire-accommodating portion of the first layer (the bottom layer).

Next, the winding process from the second circle of the winding wire portion $2b$ of the second layer (the uppermost layer) to the second circle of the winding wire portion $2a$ of the first layer (the bottom layer) will be explained. In this process, the winding process for forming the second circle of winding wire b2 in the winding wire portion $2b$ of the second layer (the uppermost layer) is performed at first, and then the winding process for forming the second circle of winding wire a2 in the winding wire portion $2a$ of the first layer (the bottom layer) is performed. As such, a single turn of winding is performed from the uppermost layer to the bottom layer in sequence, and thereby a circle of winding wire is formed in the winding wire portion of each layer. Hereinafter, this process is referred to as the second winding process, and the part formed in the second winding process becomes the second winding portion in which a single turn of winding is performed for each layer in the same winding direction from the uppermost layer to the bottom layer. Further, when the wire 2 is moved from the second circle in the winding wire portion $2b$ of the second layer (the uppermost layer) to the second circle in the winding wire portion $2a$ of the first layer (the bottom layer), it passes through a slit 3 provided in the plate portion $1b$ and enters into the wire-accommodating portion of the first layer (the bottom layer) from the wire-accommodating portion of the second layer (the uppermost layer).

In this way, the first circle of winding wire a1 in the winding wire portion $2a$ of the first layer (the bottom layer) and the first circle of winding wire b1 in the winding wire portion $2b$ of the second layer (the uppermost layer) are formed by performing the first winding process, and then the second circle of winding wire b2 in the winding wire portion $2b$ of the second layer (the uppermost layer) and the second circle of winding wire a2 in the winding wire portion $2a$ of the first layer (the bottom layer) are formed by performing the second winding process. Similarly below, the first winding process and the second winding process are repeated alternatively so that the third to sixth circle of winding wires a3 to a6 in the winding wire portion $2a$ of the first layer (the bottom layer) and the third to sixth circle of winding wires b3 to b6 in the winding wire portion $2b$ of the second layer (the uppermost layer) are formed. The thus formed winding wire portion $2a$ of the first layer (the bottom layer) and the winding wire portion $2b$ of the second layer (the uppermost layer) become winding wire portions that are wound 6 circles in a plane. The planar winding wire portion $2a$ faces the winding wire portion $2b$ via the plate portion $1b$.

As described above, the coil with a double layered structure shown in FIG. 3 and FIG. 4 according to the second embodiment is formed by performing the first winding process and the second winding process each for three times. In other words, the first circle of winding wire a1 in the winding wire portion $2a$ of the first layer (the bottom layer) and the first circle of winding wire b1 in the winding wire portion $2b$ of the second layer (the uppermost layer) are formed by performing the first winding process for the first time, and then the second circle of winding wire b2 in the winding wire portion $2b$ of the second layer (the uppermost layer) and the second circle of winding wire a2 in the winding wire portion $2a$ of the first layer (the bottom layer) are formed by performing the second winding process for the first time. Then, the third circle of winding wire a3 in the winding wire portion $2a$ of the first layer (the bottom layer) and the third circle of winding wire b3 in the winding wire portion $2b$ of the second layer (the uppermost layer) are formed by performing the first winding process for the second time, and then the fourth circle of winding wire b4 in the winding wire portion $2b$ of the second layer (the uppermost layer) and the fourth circle of winding wire a4 in the winding wire portion $2a$ of the first layer (the bottom layer) are formed by performing the second winding process for the second time. Next, the fifth circle of winding wire a5 in the winding wire portion $2a$ of the first layer (the bottom layer) and the fifth circle of winding wire b5 in the winding wire portion $2b$ of the second layer (the uppermost layer) are formed by performing the first winding process for the third time, and then the sixth circle of winding wire b6 in the winding wire portion $2b$ of the second layer (the uppermost layer) and the sixth circle of winding wire a6 in the winding wire portion 2a of the first layer (the bottom layer) are formed by performing the second winding process for the third time.

The winding wire portions 2a and 2b may also be wound in any one of shapes such as a circle, an oval, a substantial quadrangle or the like. In addition, the location where the slit is provided is not particularly restricted, but it is preferred that the slit is provided around the bending part (the angle part when wound to be substantially quadrangular) of the wire 2. The thickness of the plate portion 1b is preferably decided by the closing effect, and the angle of the slit 3 (which is provided in the plate portion 1b) to which the wire 2 abuts is preferably to be chamfered as shown in FIG. 5 (the part surrounded by the circle 4 refers to the part which is chamfered). The Litz wire is preferably used as the wire 2. Further, a wire obtained by covering the Litz wire with an insulating tube may also be used as the wire 2.

Figure 6:
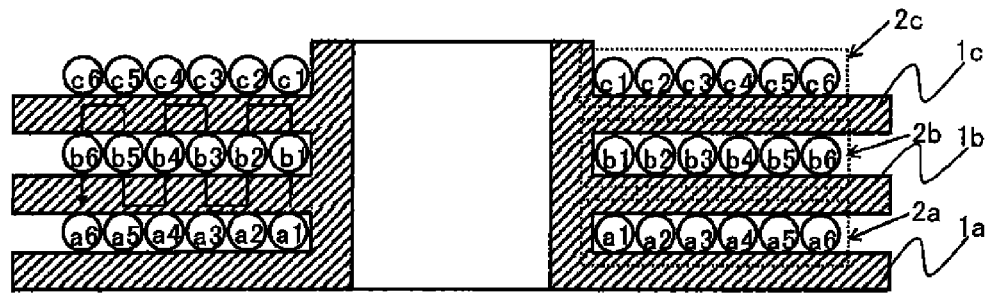
FIG. 6 is a sectional view showing the section of the coil with a three layered structure.

Hereinafter, the winding process for forming the winding wire portion in a coil with a three layered structure will be explained with reference to FIG. 6. FIG. 6 is a sectional view of the coil with a three layered structure, and the coil with a three layered structure is provided with a winding wire portion 2a of the first layer (the bottom layer), a winding wire portion 2b of the second layer and a winding wire portion of the third layer 2c (the uppermost layer). Similar to the coil with a double layered structure shown in FIG. 3 and FIG. 4, the coil with a three layered structure is also formed by performing the first winding process and the second winding process each for three times.

Firstly, with the first winding process, the winding processes for forming the first circle of winding wire a1 in the winding wire portion 2a of the first layer (the bottom layer), the first circle of winding wire b1 in the winding wire portion 2b of the second layer and the first circle of winding wire c1 in the winding wire portion 2c of the third layer (the uppermost layer) are performed in sequence. Then, with the second winding process, the winding processes for forming the second circle of winding wire c2 in the winding wire portion 2c of the third layer (the uppermost layer), the second circle of winding wire b2 in the winding wire portion 2b of the second layer and the second circle of winding wire a2 in the winding wire portion 2a of the first layer (the bottom layer) are performed in sequence. Similarly below, the first winding process and the second winding process are repeated alternatively so that the third to sixth circle of winding wires a3 to a6 in the winding wire portion 2a of the first layer (the bottom layer), the third to sixth circle of winding wires b3 to b6 in the winding wire portion 2b of the second layer and the third to sixth circle of winding wires c3 to c6 in the winding wire portion 2c of the third layer (the uppermost layer) are formed. The thus formed winding wire portion 2a of the first layer (the bottom layer), the winding wire portion 2b of the second layer and the winding wire portion 2c of the third layer (the uppermost layer) become winding wire portions that are wound 6 circles in a plane.

As such, in the case involving the coil with a three layered structure, the winding wire portion in each layer can also be formed by alternatively repeating the first winding process and the second winding process. In addition, in the structure with three layers, a slit is also provided in the plate portion 1c. The slit provided in the plate portion 1c is arranged in a position substantially the same as that of the slit provided in the plate portion 1b. That is, when viewed in a direction perpendicular to the plate portion 1c, the slit provided in the plate portion 1c and the slit provided in the plate portion 1b are substantially coincide in position.

Further, when the coil has a structure with four or more layers, the winding wire portion of each layer can also be formed by alternatively repeating the first winding process and the second winding process. The number of circles formed in the winding wire portion of each layer can be changed in accordance with the repeating times of the first winding process and the second winding process. For example, when the number of circles in the winding wire portion of each layer is set to be 8, the first winding process and the second winding process are respectively performed for four times. When the number of circles in the winding wire portion of each layer is set to be 9, the first winding process is performed for another time after the first winding process and the second winding process are respectively performed for four times. Further, if the circle number is to be differed among the winding wire portions of each layer, the winding process for the winding wire portion of which the circle number is to be decreased should be skipped (for example, after the winding process for the first layer, the winding process continues on the third layer with the winding process omitted for the second layer) or the winding process for the outmost circle is stopped halfway.

Figure 7:
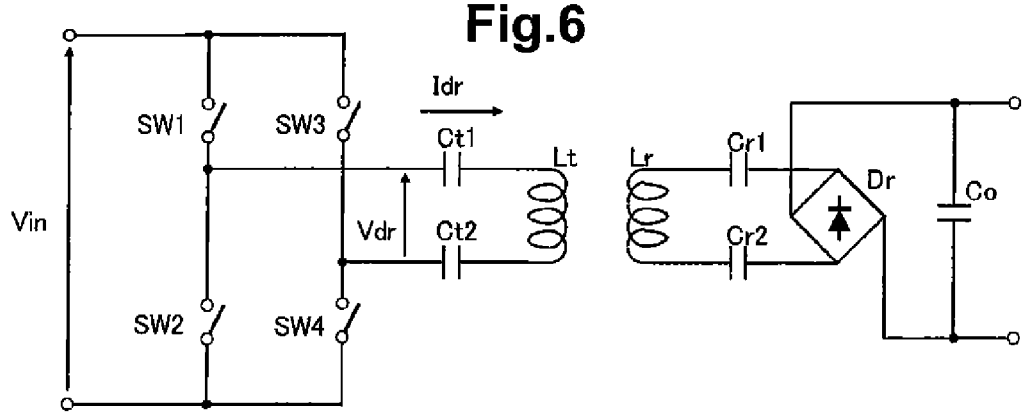
FIG. 7 is a circuit diagram showing the principle part of the contactless power transmission circuit.

Then, the contactless power transmission circuit according to the present invention in which the coil with a multilayered structure is used as a coil for transmitting power or a coil for receiving power will be explained with reference to FIG. 7. In FIG. 7, the principle circuit which is connected to the power transmitting coil and the principle circuit which is connected to the power receiving power are shown. The driving circuit for supplying an alternating current to the power transmitting coil Lt is composed of switching elements SW1 to SW4. The switching element SW1 and the switching element SW2 are connected in series, and an input voltage Vin is applied to both ends. Similarly, the switching element SW3 and the switching element SW4 are connected in series, and an input voltage Vin is applied to both ends. The power transmitting coil Lt has one end connected to one end of the capacitor Ct1 and the other end connected to one end of the capacitor Ct2. The other end of the capacitor Ct1 is connected to the junction between the switching element SW1 and the switching element SW2, and the other end of the capacitor Ct2 is connected to the junction between the switching element SW3 and the switching element SW4. The current flowing through the power transmitting coil Lt is controlled by the on-off state of the switching elements SW1 to SW4.

The power receiving circuit for supplying the power received by the power receiving coil Lr to the load is composed of a bridge diode Dr and a capacitor Co. The power receiving coil Lr has one end connected to one end of the capacitor Cr1 and the other end connected to one end of the capacitor Cr2. The other end of the capacitor Cr1 is connected to one input of the bridge diode Dr, and the other end of the capacitor Cr2 is connected to the other input of the bridge diode Dr. The capacitor Co is connected between the output terminals of the bridge diode Dr. The current flowing through the power receiving coil Lr is full-wave rectified by the bridge diode Dr and is then provided to the capacitor Co.

Then, the switching operation of the switching elements SW1 to SW4 will be explained. For example, the period during which the switching element SW1 and the switching element SW4 are on and the switching element SW2 and the switching element SW3 are off, and the period during which the switching element SW1 and the switching element SW4 are off and the switching element SW2 and the switching element SW3 are on will be alternatively repeated. The voltage Vdr between the junction of the switching element SW1 and the switching element SW2 and the junction of the switching element SW3 and the switching element SW4 (the voltage deems the side where the junction between the switching element SW3 and the switching element SW4 is located as the reference) changes based on the on-off state of the switching elements SW1 to SW4. When the switching element SW1 and the switching element SW4 are on and the switching element SW2 and the switching element SW3 are off, the voltage Vdr has a positive voltage value with its absolute value equal to that of the input voltage Vin. On the other hand, when the switching element SW1 and the switching element SW4 are off and the switching element SW2 and the switching element SW3 are on, the voltage Vdr has a negative voltage value with its absolute value equal to that of the input voltage Vin.

The alternating current based on the alternating voltage Vdr flows through the power transmitting coil Lt and thereby the power transmitting coil Lt will generate a magnetic field. At that time, the alternating current which is based on the magnetic field generated by the power transmitting coil Lt flows through the power receiving coil Lr, and the current is full-wave rectified by the bridge diode Dr and is then supplied to the capacitor Co.

Figure 8:
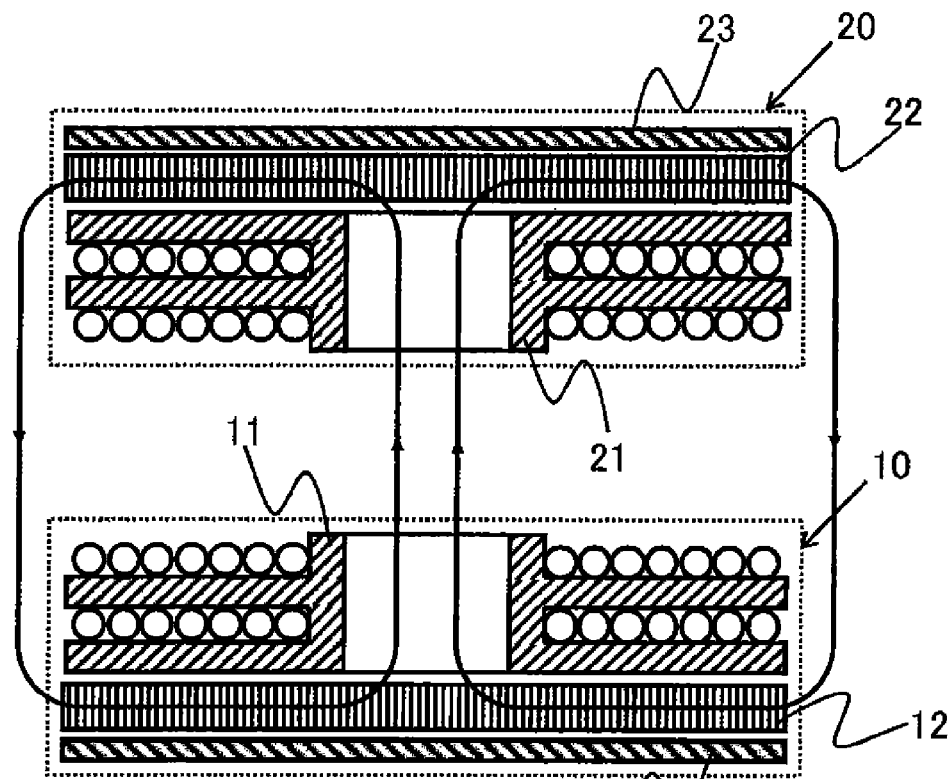
FIG. 8 is a sectional view showing the structures of the power transmitting coil and the power receiving coil.
Figure 9:
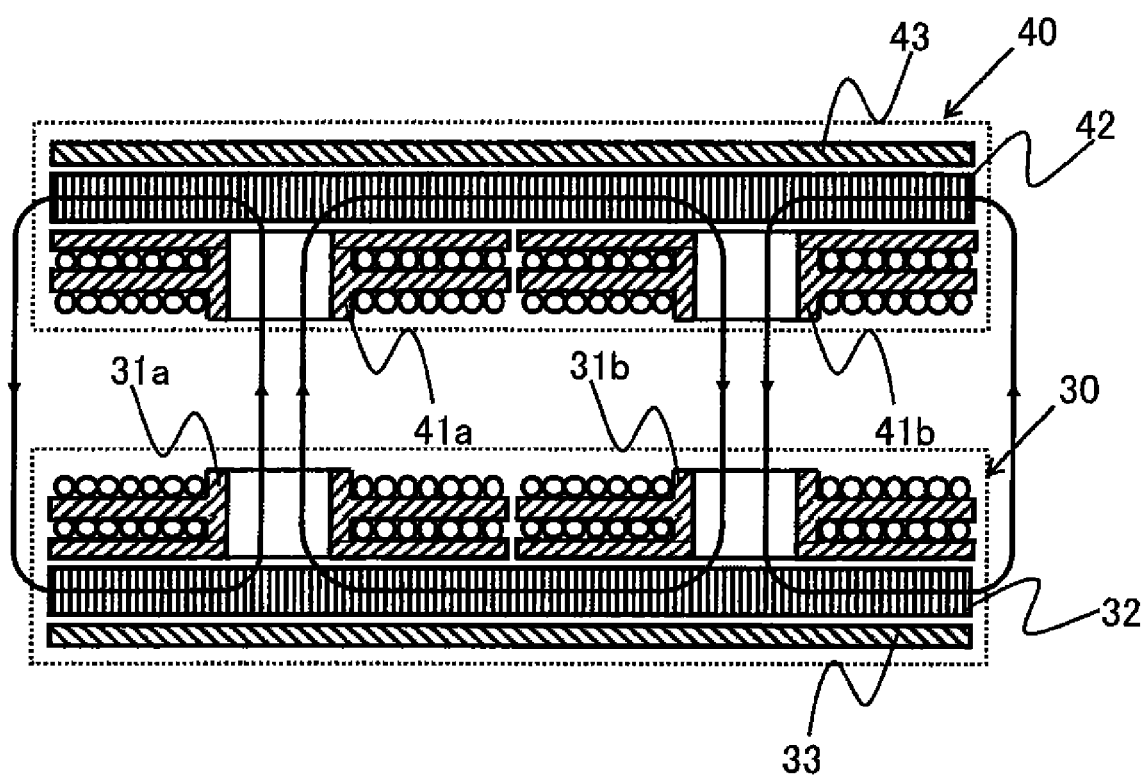
FIG. 9 is a sectional view showing the structures of the power transmitting coil and the power receiving coil.

Next, an example in which the coil with a multilayered structure of the present invention is used as the power transmitting coil Lt or the power receiving coil Lr shown in FIG. 7 will be explained with reference to FIG. 8 and FIG. 9. FIG. 8 and FIG. 9 are sectional views showing the power transmitting coil and the power receiving coil both of which are oppositely disposed. In FIG. 8, both the power transmitting coil Lt and the power receiving coil Lr are composed of one coil, and in FIG. 9, both the power transmitting coil Lt and the power receiving coil Lr are composed of two coils.

In the example of FIG. 8, a coil 11 with a double layered structure is used to form the power transmitting coil 10, and a coil 21 with a double layered structure is used to form the power receiving coil 20. The power transmitting coil 10 is composed of the coil 11, a magnetic member 12 and a metallic plate 13. The magnetic member 12 and the metallic plate 13 are disposed in sequence at the opposite side of the coil 11 the side of which faces the coil 21. The power receiving coil 20 is composed of the coil 21, a magnetic member 22 and a metallic plate 23. The magnetic member 22 and the metallic plate 23 are disposed in sequence at the opposite side of the coil 21 the side of which faces the coil 11. These metallic plates 13 and 23 are composed of an aluminum plate or a copper plate.

If such a structure is used in the contactless power transfer, the balance of the parasitic capacitance in the coil will deteriorate so that the voltage to ground of the metallic plate 13 or the voltage to ground of the metallic plate 23 will increase. However, in the coil with a multilayered structure according to the present invention, since the balance of the parasitic capacitance is good, the voltage to ground of the metallic plate 13 or the voltage to ground of the metallic plate 23 can be prevented from increasing.

In the example of FIG. 9, the coils 31a and 31b both with a double layered structure are used to constitute the power transmitting coil 30, and the coils 41a and 41b both with a double layered structure are used to constitute the power receiving coil 40. The power transmitting coil 30 is composed of the coils 31a and 31b, a magnetic member 32 and a metallic plate 33. The magnetic member 32 and the metallic plate 33 are disposed in sequence at a side of the coils 31a and 31b which side is opposite to that facing the coils 41a and 41b. The power receiving coil 40 is composed of the coils 41a and 41b, a magnetic member 42 and a metallic plate 43. The magnetic member 42 and the metallic plate 43 are disposed in sequence on a side of the coils 41a and 41b which side is opposite to that facing the coils 31a and 31b. In addition, the direction of the magnetic field generated by the coil 41a and the direction of the magnetic field generated by the coil 41b are set to be opposite to each other. These metallic plates 33 and 43 are composed of an aluminum plate or a copper plate.

The coil 41a and the coil 41b are connected to each other via the ends extending from the winding wires on the outermost periphery. With such a connection, even if the winding wires of the coil 41a and the coil 41b on the outermost periphery are close to each other to lower the voltage difference between these two coils, no special means for voltage protection is needed. Further, similar to the situation in the power transmitting coil 10 and the power receiving coil 20, the voltage to ground of the metallic plate 33 or the voltage to ground of the metallic plate 43 can be prevented from increasing.

The embodiments of the coil with a multilayered structure of the present invention have been described above, but the present invention is not limited to these embodiments described above and various modifications can be applied without departing from the spirit. For example, with respect to the layer number of the multilayered structure and the circle number of the winding wire portion in each layer, the coil can be constituted with various combinations. However, it is preferable that the number of the circles of the winding wire portion in each layer is larger than the number of the layers in the multilayered structure. In addition, with respect to the wire, wire materials other than the Litz wire can be used.

What is claimed is:
1. A coil with a stacked structure, comprising:
a bobbin which comprises a plate portion for separating a wire-accommodating portion in each layer, and
a winding wire portion which comprises a wire wound multiple times in a plane and is accommodated in the wire-accommodating portion in each layer,
wherein the winding wire portion includes a first winding portion formed by performing a single turn of winding in each layer in a same winding direction from a bottom layer to an uppermost layer of the wire-accommodating portions, and a second winding portion formed by performing a single turn of winding in each layer in a same winding direction from the uppermost layer to the bottom layer of the wire-accommodating portions, and
the winding directions of the first winding portion and the second winding portion are identical to each other, and the first winding portion and the second winding portion are joined in the uppermost layer or the bottom layer of the wire-accommodating portions.
2. The coil of claim 1, wherein,
the plate portion comprises a slit, and
the wires of the winding wire portion accommodated in the wire-accommodating portion in the adjacent upper and lower layers are joined via the slit.
3. A contactless power transmission circuit, comprising:
a power transmitting coil,
a driving circuit for supplying an alternating current to the power transmitting coil,
a power receiving coil, and
a power receiving circuit for supplying a power received by the power receiving coil to a load,
wherein at least one of the power transmitting coil and the power receiving coil is the coil according to claim 1.

* * * * *